(12) United States Patent
Makmel et al.

(10) Patent No.: US 10,462,112 B1
(45) Date of Patent: Oct. 29, 2019

(54) SECURE DISTRIBUTED AUTHENTICATION DATA

(71) Applicant: CyberArk Software Ltd., Petach-Tikva (IL)

(72) Inventors: Gil Makmel, Petach-Tikva (IL); Or Gamliel, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/243,730

(22) Filed: Jan. 9, 2019

(51) Int. Cl.
  *H04L 29/06* (2006.01)
  *H04L 9/32* (2006.01)

(52) U.S. Cl.
  CPC ........ *H04L 63/0435* (2013.01); *H04L 9/3242* (2013.01); *H04L 63/062* (2013.01)

(58) Field of Classification Search
  CPC .. H04L 63/0435; H04L 63/062; H04L 9/3242
  USPC ........................................................ 713/168
  See application file for complete search history.

(56) References Cited

U.S. PATENT DOCUMENTS

| | | | |
|---|---|---|---|
| 6,230,269 B1 * | 5/2001 | Spies ................ | H04L 9/302 380/279 |
| 8,959,650 B1 * | 2/2015 | Richards ............... | G06F 21/44 709/227 |
| 2007/0261107 A1 * | 11/2007 | Ng ....................... | H04L 63/062 726/5 |
| 2008/0069206 A1 * | 3/2008 | Yang .................. | H04N 7/17318 375/240.01 |
| 2008/0301438 A1 * | 12/2008 | Parkinson ............. | H04L 9/3218 713/156 |
| 2009/0198997 A1 * | 8/2009 | Yeap .................... | H04L 63/0823 713/155 |
| 2014/0189808 A1 * | 7/2014 | Mahaffey ............... | H04L 63/083 726/4 |
| 2017/0041146 A1 * | 2/2017 | Davis .................... | H04L 9/3247 |
| 2018/0114220 A1 * | 4/2018 | Ekberg ............... | G06Q 20/3829 |

* cited by examiner

*Primary Examiner* — Abu S Sholeman
(74) *Attorney, Agent, or Firm* — Finnegan, Henderson, Farabow, Garrett & Dunner, LLP

(57) ABSTRACT

Disclosed embodiments relate to systems and methods for secure distributed authentication data. Techniques include identifying asserted authentication data associated with the request, generating an encryption key based on the asserted authentication data, generating a non-restorable digital representation of the asserted authentication data, retrieving an encrypted non-restorable digital representation of authentication data associated with the client identity, decrypting the retrieved encrypted non-restorable digital representation of authentication data using the encryption key, comparing the decrypted non-restorable digital representation of authentication data to the non-restorable digital representation of asserted authentication data; and providing a token for use in an authentication process for the client identity upon determining, based on a match between the stored non-restorable digital representation of authentication data and the non-restorable digital representation of version of the asserted authentication data.

18 Claims, 7 Drawing Sheets

SECURE DISTRIBUTED AUTHENTICATION DATA

BACKGROUND

Users frequently access a variety of secured resources, such as online accounts or networks, by supplying some form of authentication credentials. Social networks, bank accounts, online file storage services, and corporate network accounts, for example, commonly require users to provide a username and password. Protecting these authentication credentials is critically important for individuals and organizations. Users rely on these online resources to securely store personal data such as credit card information, activity data, and other personal identification data. If these credentials are somehow leaked or mishandled, it can lead to severe reputational and financial loss to the user or for organizations. Further, users often use the same or similar credentials for multiple accounts or networks, so if authentication data is compromised for one resource, it can have cascading effects for other secured resources or networks.

Unfortunately, high-profile data breaches or inadvertent releases have become commonplace. Even large, well-known enterprises (e.g., leading social network providers, software companies, gaming developers, e-commerce sites, etc.) cannot guarantee the safe storage and handling of users' authentication credentials. Authentication data is often being used and stored in an unsecure manner. In many authentication processes, when a user wants to authenticate itself for access to a particular resource, the user passes authentication credentials to an authentication server. The authentication server then decides if the supplied credentials (or a hash) match stored credentials (or a hash) for the user. In some circumstances, the user's authentication data is stored in an unencrypted manner on hard drives or in databases. This transfer and storage of data leaves it vulnerable to data breaches or theft. For example, if the authentication server is compromised the user's authentication data may be exposed.

Even in situations where attempts are made at data security, existing solutions focus on hardening the authentication component itself. For example, some authentication services may encrypt the user's authentication data. The data, however, is often stored on a single server (or limited group of servers), where it may still be vulnerable to various attack techniques. Further, the encryption keys used to encrypt the data are often stored in the memory of the authentication service, leaving it vulnerable as well.

Accordingly, in view of these and other deficiencies in existing techniques, technological solutions are needed for securely authenticating a user and storing user authentication data. Solutions should advantageously allow users to uniquely control the use and storage of their authentication credentials. An authentication system should be capable of authenticating a user without storing the user's original authentication credentials, and the encryption key used to encrypt the data should be generated with each request, without being stored. Therefore, even if data is stolen from the authentication system, an attacker would not obtain or be able to reproduce the user's original authentication data or the encryption key.

SUMMARY

The disclosed embodiments describe non-transitory computer readable media, systems, and methods for secure distribution, storage, and use of client authentication data.

For example, in an exemplary embodiment, there may be a non-transitory computer readable medium including instructions that, when executed by at least one processor, cause the at least one processor to perform operations for secure authentication for access to a restricted resource. The operations may comprise receiving a request for access to the restricted resource by a client identity; identifying asserted authentication data associated with the request; generating, in response to the request, an encryption key based on the asserted authentication data; generating, in response to the request, a non-restorable digital representation of the asserted authentication data; retrieving an encrypted digital representation of authentication data associated with the client identity; decrypting the retrieved encrypted digital representation of authentication data using the encryption key to produce a decrypted digital representation of authentication data; comparing the decrypted digital representation of authentication data to the generated digital representation of the asserted authentication data; and providing a token for use in an authentication process for the client identity upon determining, based on the comparing, a match between the stored digital representation of authentication data and the digital representation of the asserted authentication data.

According to a disclosed embodiment, the encrypted digital representation of authentication data may be retrieved as a plurality of data portions stored in a plurality of data storage locations; and retrieving the encrypted digital representation of authentication data comprises reconstructing the encrypted digital representation of authentication data from the plurality of data portions.

According to a disclosed embodiment, generating the non-restorable digital representation of the asserted authentication data may be performed using a hash function algorithm.

According to a disclosed embodiment, the request for access to the restricted resource may include the asserted authentication data.

According to a disclosed embodiment, the encryption key may be a symmetric key.

According to a disclosed embodiment, the operations may further comprise transmitting the token to at least one of: the client identity or a third-party authentication service.

According to a disclosed embodiment, the asserted authentication data may be signed with a private key of the client and the operations may further comprise verifying the client identity based on the asserted authentication data using a public key associated with the client identity.

According to a disclosed embodiment, the asserted authentication data may be encrypted with a public key of the authentication system and the operations may further comprise decrypting the asserted authentication data using a private key associated with the authentication system.

According to a disclosed embodiment, the operations may further comprise receiving an original authentication data associated with the client identity; generating an original non-restorable digital representation of authentication data based on the original authentication data; generating an original encryption key based on the original authentication data; encrypting the original digital representation of authentication data using the original encryption key to generate the encrypted digital representation of authentication data; and storing the encrypted digital representation of authentication data.

According to a disclosed embodiment, storing the encrypted digital representation of authentication data may include separating the encrypted digital representation of authentication data into a plurality of data portions and storing the plurality of data portions across a plurality of storage resources.

According to another disclosed embodiment, a method may be implemented for secure authentication for access to a restricted resource. The method may comprise receiving a request for access to the restricted resource by a client identity; identifying asserted authentication data associated with the request; generating, in response to the request, an encryption key based on the asserted authentication data; generating, in response to the request, a non-restorable digital representation of the asserted authentication data; retrieving an encrypted digital representation of authentication data associated with the client identity; decrypting the retrieved encrypted digital representation of authentication data using the encryption key to produce a decrypted digital representation of authentication data; comparing the decrypted digital representation of authentication data to the generated digital representation of the asserted authentication data; and providing a token for use in an authentication process for the client identity upon determining, based on the comparing, a match between the stored digital representation of authentication data and the digital representation of the asserted authentication data.

According to a disclosed embodiment, the encrypted digital representation of authentication data may be retrieved as a plurality of data portions stored in a plurality of data storage locations; and retrieving the encrypted digital representation of authentication data may comprise reconstructing the encrypted digital representation of authentication data from the plurality of data portions.

According to a disclosed embodiment, generating the non-restorable digital representation of the asserted authentication data may be performed using a hash function algorithm.

According to a disclosed embodiment, the request for access to the restricted resource may include the asserted authentication data.

According to a disclosed embodiment, the encryption key may be a symmetric key.

According to a disclosed embodiment, the method may further comprise transmitting the token to at least one of: the client identity or a third-party authentication service.

According to a disclosed embodiment, the asserted authentication data may be signed with a private key of the client and the method may further comprise verifying the client identity based on the asserted authentication data using a public key associated with the client identity.

According to a disclosed embodiment, the asserted authentication data may be encrypted with a public key of the authentication system and the method further comprise decrypting the asserted authentication data using a private key associated with the authentication system.

According to a disclosed embodiment, the method may further comprise receiving an original authentication data associated with the client identity; generating an original non-restorable digital representation of authentication data based on the original authentication data; generating an original encryption key based on the original authentication data; encrypting the original digital representation of authentication data using the original encryption key to generate the encrypted digital representation of authentication data; and storing the encrypted digital representation of authentication data.

According to a disclosed embodiment, storing the encrypted digital representation of authentication data may include separating the encrypted digital representation of authentication data into a plurality of data partitions and storing the plurality of data partitions across a plurality of storage resources.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of secure distribution of authentication data described herein overcome several technological problems. As discussed below, the user of a restricted resource may provide authentication data to an authentication service in order to access the resource. Using the disclosed techniques, the authentication data may never be used or stored by the authentication service. Instead, the authentication service generates a non-restorable digital representation of the user's authentication data, which is stored for future authentication of the user. This way, even if the stored hashed authentication data is misappropriated or leaked, the user's original authentication data remains protected and in the sole possession of the user.

Further, in some embodiments, the hashed authentication data may be encrypted using an encryption key based on the provided authentication data. This encryption key may be generated based on the user's authentication data with each login. The encryption key, along with the hashed authentication data may be stored only temporarily in the system's volatile memory (e.g., RAM, DRAM, SDRAM, Flash, etc.). In some embodiments, the encrypted hashed authentication data may also be split into multiple portions and saved across multiple storage resources. The user's original authentication data and the encryption key are not transferred nor stored anywhere in the process. The encryption key is actively generated based on the provided authentication data. Therefore, any use (i.e. decryption) of the distributed authentication data is possible only by the system that originally generated this specific encryption key. Therefore, the entire flow is non-restorable and, in the event that data is somehow breached or exposed, the user's original authentication data and the associated encryption key will be protected. Using the disclosed methods and systems, security can be dramatically improved for almost any authentication system.

Reference will now be made in detail to the disclosed embodiments, examples of which are illustrated in the accompanying drawings.

Figure 1:
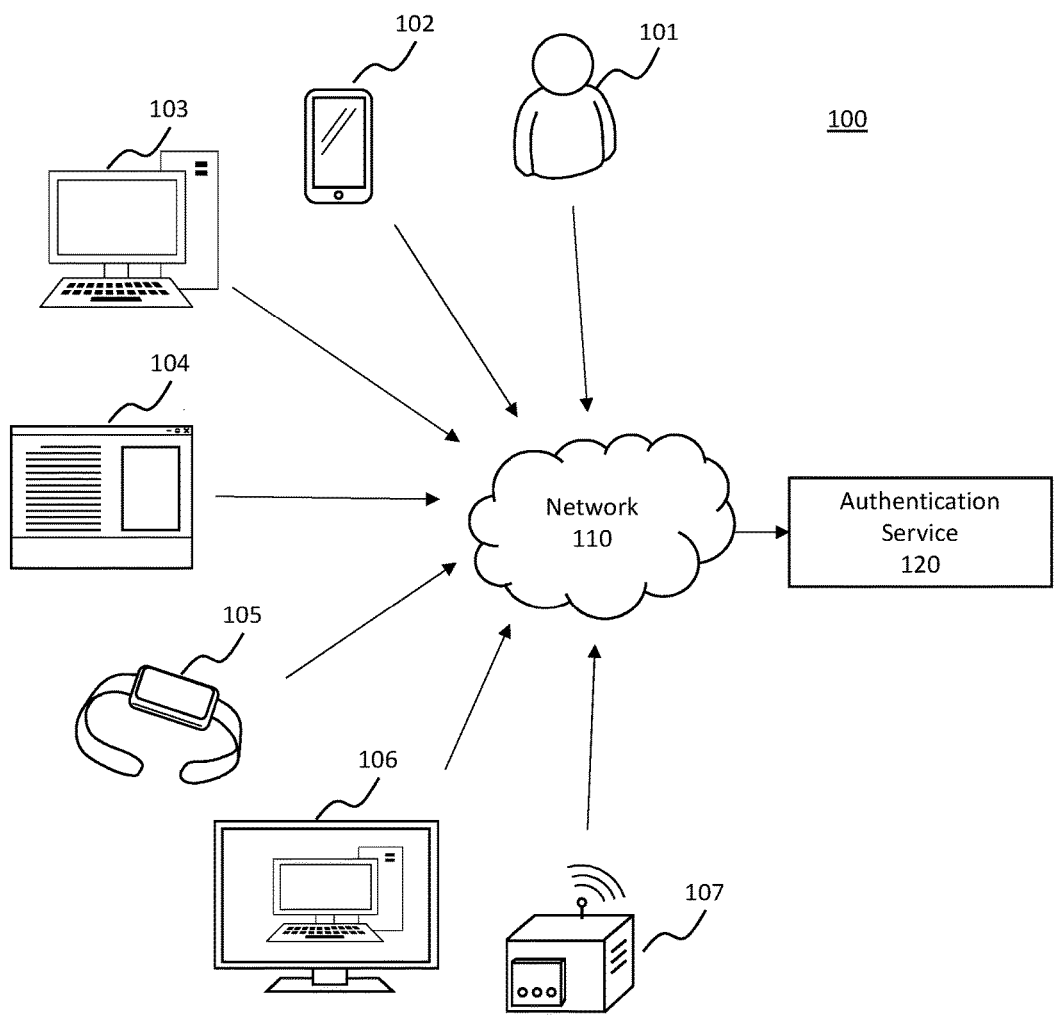
FIG. 1 is a block diagram of an example system for secure distributed authentication data in accordance with disclosed embodiments.

FIG. 1 is a block diagram of an example system 100 for secure distributed authentication data consistent with disclosed embodiments. As shown, system 100 may include a plurality of different client identities 101, 102, 103, 104, 105, 106, and 107 in communication with an authentication service 120. The client identities may include, for example, an individual user 101. The client identity may also be a mobile device 102 such as a mobile phone or tablet. The client identity may also include a computer device 103, such as a desktop or laptop computer. The client identity may also be an application 104 in communication with an authentication service. Application 104 may include, for example, computer applications, scripts, code segments, operating systems, mobile applications, or web applications, etc. The client identity may also include a wearable device 105. Wearable device 105 may include, for example, smart watches, smart jewelry, implantable devices, fitness trackers, smart clothing, or head-mounted displays, etc. The client identity may also include a virtual machine 106 (e.g., virtualized computer, container instance, serverless code, etc.) or an IoT device 107 (e.g., smart home device, industrial devices (agricultural, manufacturing, etc.) or other various connected technologies). While the present disclosure provides examples of client identities and devices, it should be noted that aspects of the disclosure, in their broadest sense, are not limited to these examples and authentication may be provided for various client identities.

Client identities 101, 102, 103, 104, 105, 106, and 107 may communicate with authentication service 120 through network 110. Such communications may take place across various types of networks 110, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, a private data network, a virtual private network using a public network, a nearfield communications technique (e.g., Bluetooth, infrared, etc.), or various other types of network communications. In some embodiments, the communications may take place across two or more of these forms of networks 110 and protocols.

Authentication service 120 may be configured to receive authentication data or other data from client identities 101, 102, 103, 104, 105, 106, and 107 through network 110. Authentication service 120 may be configured to authenticate the client identity (e.g., user 101), as discussed further below. In some exemplary embodiments, authentication service 120 may be integral to the resource the client identity is attempting to access. For example, the authentication service may be part of a network or website. In other embodiments, authentication service 120 may be paired with a third-party authentication service or protocol, providing authentication of the client identity for a separate resource.

Authentication service 120 may be used to authenticate client identity 101, 102, 103, 104, 105, 106, or 107 for various different resources, as discussed below. For example, authentication service 120 may be used for accessing a website (e.g., e-commerce sites, file sharing sites, document management or archiving sites, utility provider sites, credit card sites, banking sites, online newspapers, etc.). In some embodiments, authentication service 120 may also provide authentication for social media applications (e.g., Facebook™, Instagram™, Twitter™, etc.). In other embodiments, authentication service 120 may provide access to a network, such as a home or corporate network, or other various types of networks. Authentication service 120 may also be used for accessing document sharing platforms, such as Dropbox™ Google Docs™, or iCloud™, or another network environment configured to store, exchange, and archive documents. While the present disclosure provides examples of resources for which authentication service 120 may facilitate access, it should be noted that aspects of the disclosure, in their broadest sense, are not limited to these examples.

Figure 2:
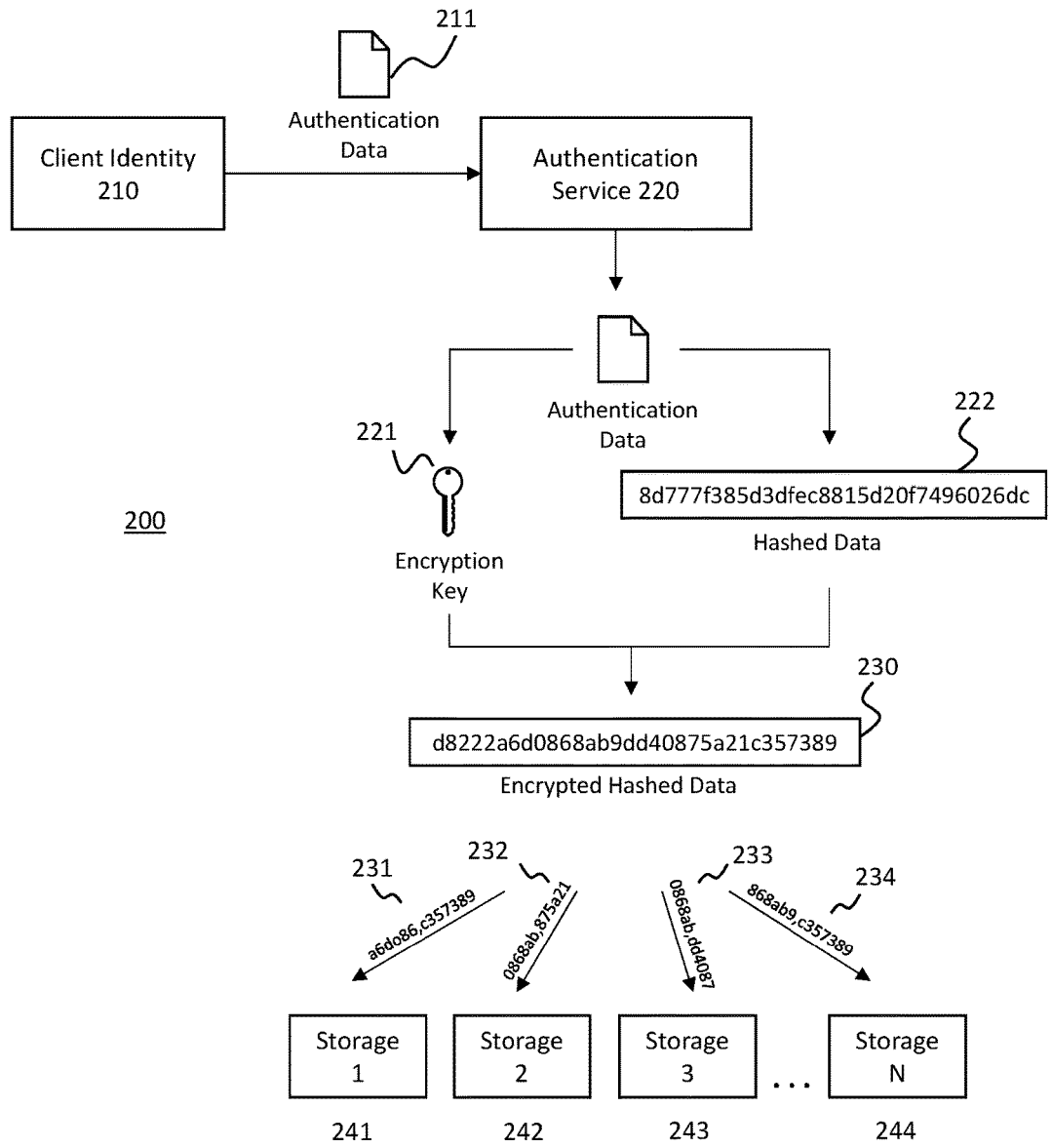
FIG. 2 is a flowchart depicting an example process for registering authentication data of a client identity in accordance with disclosed embodiments.

FIG. 2 is an illustration of a process 200 for registering authentication data of a client identity in accordance with disclosed embodiments. As shown in FIG. 2, process 200 includes a client identity 210 and an authentication service 220. Client identity 210 may be any of the example client identities 101, 102, 103, 104, 105, 106, or 107 as shown in FIG. 1, or any other form of client identity. For example, client identity 210 may be a user requesting to access or register for a protected network resource through authentication service 220. Client identity 210 may provide authentication data 211 to authentication service 220, which may be stored according to process 200 for later authentication of client identity 210. Authentication data 211 may include a form of authentication credentials required to access the restricted resource. For example, authentication data 211 may be a username and/or password associated with client identity 210. In accordance with the present disclosure, authentication data 211 may also be any form of authentication data associated with client 210 (e.g., credential data, identification number, phone number, email address, biometric data, a session identifier, token, etc.). Authentication data 211 may also already be in a hashed or otherwise non-restorable digital representation form of other authentication credentials.

Authentication service 220 may receive authentication data 211 from client identity 210 through various methods. For example, authentication data 211 may be transmitted through a network, such as network 110 shown in FIG. 1. Upon receiving authentication data 211, authentication service 220 may generate encryption key 221 and hashed data 222. Encryption key 221 may be generated based on the received authentication data 211. Encryption key 221 may be, for example, a symmetric encryption key. In order to generate encryption key 221, authentication service 220 may store, or have access to, encryption algorithms such as Data Encryption Standard (DES), Triple DES (TDES), Advanced Encryption Standard (AES), CAST-128, Twofish, Serpent or various others.

Hashed data 222 may be generated by authentication service 220 based on authentication data 211 received from client identity 210. Hashed data 222 may be any form of non-restorable digital manipulation of authentication data 211. For example, hashed data 222 may be a hashed value of authentication data 211. Accordingly, authentication service 220 may store, or have access to, cryptographic hash algorithms such as message-digest algorithm (MD5), Secure Hash Algorithm 1 (SHA-1), Secure Hash Algorithm 2 (SHA-2), Secure Hash Algorithm 3 (SHA-3), RACE Integrity Primitives Evaluation Message Digest (RIPEMD-160), or any other cryptographic hash function. While the present disclosure provides examples of hashing functions, it should be noted that the term "hashed" is used throughout by way of example only, and the present disclosure is not limited to any particular form of non-restorable digital manipulation of authentication data.

As shown in FIG. 2, encrypted hashed data 230 is generated using encryption key 221 and hashed data 222. Encryption key 221 and hashed data 222 may be stored temporarily (e.g., in secured volatile memory of the authentication system) for generating encrypted hashed data 230. The encrypted version of the hashed data 230 may also be stored temporarily (e.g., in cache on the authentication service 220) or on a long-term basis. In some embodiments, encrypted hashed data 230 may be stored in a memory associated with authentication service 220. In other embodiments, encrypted hashed data 230 may be stored remotely, for example on a remote storage server. Encrypted hashed data 230 may also be stored on an online file storage service, such as one provided by IBM Cloud™, Amazon Web Services™, Microsoft Azure™, Carbonite™, or others.

In some embodiments of the present disclosure, storing the encrypted hashed authentication data 230 may include separating the encrypted hashed authentication data 230 into multiple data portions 231-234 and storing the data portions 231-234 across a plurality of storage resources 241-244. For example, as shown in FIG. 2, encrypted hashed authentication data 230 is separated into Portion$_1$ 231, Portion$_2$ 232, Portion$_3$ 233, and Portion$_n$ 234. Encrypted hashed authentication data 230 may of course be split into fewer (e.g., two) or greater portions. In some embodiments, the splitting may also occur at different points in process 200. For example, process 200 may involve splitting hashed data 222 into multiple portions before it is encrypted. Each portion may then be encrypted using encryption key 221 and stored as described above.

In accordance with process 200, the authentication service 220 may be configured to perform a particular file splitting (e.g., sharding) technique. For example, the number of portions into which to split data may be based on an algorithm such as Shamir's Scheme, Blakley's Scheme, Mignotte's Scheme, Asmuth-Bloom's Scheme, or various other types of schemes. The authentication service 220 may include software-based algorithms based on these schemes, which may split the encrypted hashed data 230 into N shards and designate them for storage in X remote storage resources (e.g., multiple database, or portions of a single database) where N≤X.

Figure 3:
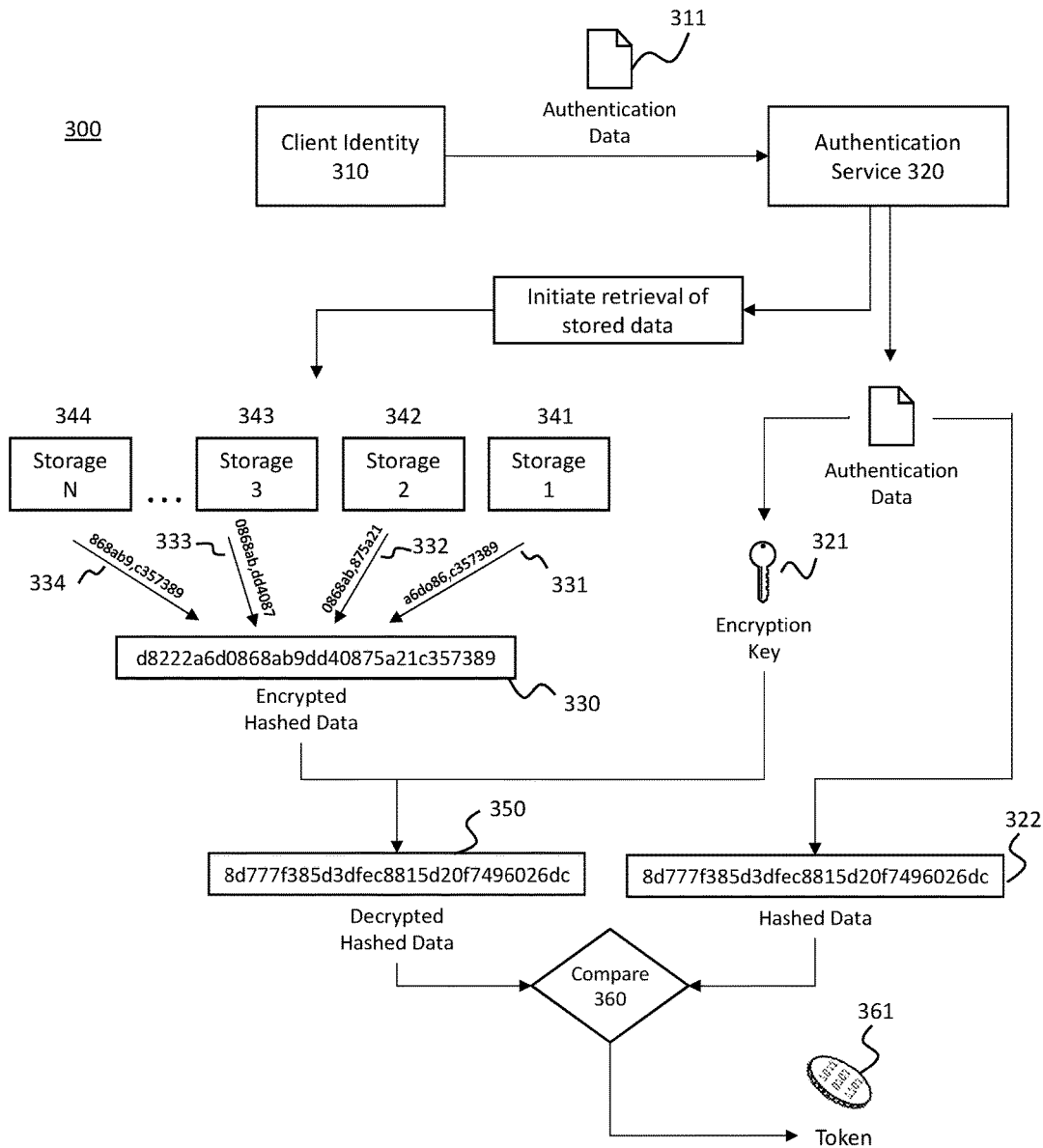
FIG. 3 is an illustration of an example process for verifying authentication data for a client identity in accordance with disclosed embodiments.

FIG. 3 is an illustration of a process 300 for verifying authentication data for a client identity in accordance with disclosed embodiments. As shown in FIG. 3, process 300 includes operations that may be performed by a client identity 310 and/or an authentication service 320. Client identity 310 may be any of the example client identities 101, 102, 103, 104, 105, 106, or 107 as shown in FIG. 1. Client identity 310 may be client identity 210 and authentication service 320 may be authentication service 220, as shown in FIG. 2. For example, client identity 210 may be requesting to login or access the protected resource registered for in process 200 through authentication service 220. Client identity 310 may provide authentication data 311 to authentication service 320. Similar to process 200, authentication data 311 may be, for example, a form of credentials required to access the restricted resource. For added security, client identity 310 may also encrypt and/or sign authentication data 311 using an asymmetric encryption key according to process 600 or process 700, described in detail below.

In accordance with the disclosed embodiments, a request for access to the restricted resource may include the asserted authentication data 311. For example, a user 310 may request access to an online resource or network resource and provide authentication credentials, such as username and password. Authentication service 320 may receive or intercept the request to authenticate the user 310 for access to the resource. Authentication service 320 may identify authentication data 311 within the request submitted by the user 310. Of course, user 310 could be a user or any other identity, including those identified with respect to FIG. 1.

Upon receiving authentication data 311, authentication service 320 may generate encryption key 321 and hashed data 322. Encryption key 321 and hashed data 322 may be stored only temporarily (e.g., in secured volatile memory of the authentication system, such as RAM, DRAM, SDRAM, Flash, etc.) for generating encrypted hashed data 330. Encryption key 321 may be generated based on the received authentication data 311. Encryption key 321 may be, for example, a symmetric encryption key. Because encryption key 321, like encryption key 221, is generated based on the received authentication data 311, encryption key 321 and encryption key 221 may be the same (or functions of one another), provided that authentication data 211 and 311 are the same. As in process 200, authentication service 320 may store, or have access to, algorithms such as DES, TDES, AES, CAST-128, Twofish, Serpent, or various others. Upon receiving authentication data 311, authentication service 320 may also decrypt and/or verify a digital signature using asymmetric cryptographic keys according to process 600 or process 700, described in detail below.

Hashed data 322 may be generated by authentication service 320 based on authentication data 311 received from client identity 310. As in process 200, hashed data 322 may be any form of non-restorable digital manipulation of authentication data 311, including a hashed value. Authentication service 320 may store, or have access to, cryptographic hash algorithms, as described in connection with process 200. It should be noted that aspects of the disclosure, in their broadest sense, are not limited to any particular form of non-restorable digital manipulation of authentication data 311.

In some embodiments, the authentication service 320 may retrieve encrypted hashed authentication data 330 associated with the client identity 310. As shown in FIG. 3, upon receiving authentication data 311, authentication service 320 may initiate retrieval of stored authentication data for verification against authentication data 311. In some embodiments, the stored hashed data may be stored locally (e.g., in the memory of authentication service 320). In other embodiments, the stored hashed data may be stored in a remote location, such as on a remote server or online file storage service.

In accordance with the present disclosure, the encrypted hashed authentication data 330 may be retrieved as a plurality of data portions stored in a plurality of data storage locations. In these embodiments, retrieving the encrypted hashed authentication data 330 associated with the client identity 310 may include reconstructing the encrypted hashed authentication data 330 from the plurality of data portions. By way of example, FIG. 3 shows the stored hashed data encrypted and split into multiple portions. Upon receipt of authentication data 311, authentication service 320 may initiate retrieval of stored hashed data. As in process 200, encrypted hashed data 330 may be split into N shards (e.g., data portions 331, 332, 333, and 334 as shown in FIG. 3) and stored in X remote storage resources (e.g., Storage 1 341, Storage 2 342, Storage 3 343, and Storage N 344 as shown in FIG. 3). Authentication service 320 may be configured to perform a particular file reconstruction based on the splitting technique used (e.g., Shamir's Scheme, Blakley's Scheme, Mignotte's Scheme, Asmuth-Bloom's Scheme, etc.).

The authentication service 320 may decrypt the retrieved encrypted hashed authentication data using the encryption key to produce a decrypted hashed authentication data 350. As shown in FIG. 3, authentication service 320 may decrypt encrypted hashed data 330 with encryption key 321. Encrypted hashed data 330 may be the encrypted hashed data 230 stored during registration process 200. As a result of the decryption, authentication service may produce decrypted hashed authentication data 350. While FIG. 3 shows the decryption process occurring after the data has been reconstructed, it should be noted that these steps may be performed in another order. For example, in accordance with the disclosed embodiments, decrypting the data may involve decrypting data portions 331, 332, 333, and 334 before the data is reconstructed. The decrypted portions may then be combined to generate the decrypted hashed data.

The authentication system may then compare the decrypted hashed authentication data 350 to the hashed version 322 of the asserted authentication data. As shown in FIG. 3 decrypted hashed authentication data 350 may be compared in an operation 360 to hashed data 322, which is a non-restorable digital representation of authentication data 311.

Embodiments of the present disclosure may further include generating and/or providing a token 361 for use in an authentication process for the client identity 310 upon determining, based on the comparing 360, a match between the decrypted hashed authentication data 350 and the hashed version of the asserted authentication data 322. For example, as shown in FIG. 3, authentication service 320 may determine through comparison 360 that hashed data 322 matches decrypted hashed data 350. Upon determining a match, authentication service 320 may generate and/or provide token 361 for use in authenticating client identity 310 for access to a requested resource or any other purpose for authentication.

Some aspects of the present disclosure may further involve transmitting the token 361 to the client identity 310. The client identity 310 may, for example, use the token 361 for access to a requested resource (e.g., a secure server, database, application, etc.). The transmission of token 361 may also occur transparently to the client identity 310 (e.g., a user), such that the client identity 310 may not detect, or may not be disturbed by, the transmission of token 361. Other aspects of the present disclosure may involve transmitting the token 361 to a third-party authentication service. For example, token 361 may be transmitted directly to the resource the client identity 310 has requested to access. In some embodiments, authentication service 320 may be integral to the requested resource itself. In other embodiments, authentication service 320 may be a separate service used to provide authentication for other resources, services, or authentication protocols.

For example, in some implementations authentication service 320 may provide a token for use in a Kerberos authentication protocol, a Security Assertion Markup Language (SAML) authentication protocol, or other types of authentication protocols. As an illustration, the disclosed embodiments may be used in conjunction with, as a modification of, or in place of an authentication service within a Kerberos protocol environment. Client identity 310 may authenticate itself to authentication service 320 by providing authentication data 311, as described above. Authentication service 320 may forward the authentication data 311 to a key distribution center (KDC). The KDC may then issue a ticket-granting ticket (TGT) to the client identity 310, which is used to verify the client identity 310 when communicating with a service on a node or principal. The Kerberos protocol and the example flow above are provided as an example only. It should be noted that process 300 may be used to modify or replace authentication services in various authentication protocols, such as SAML and others.

Figure 4:
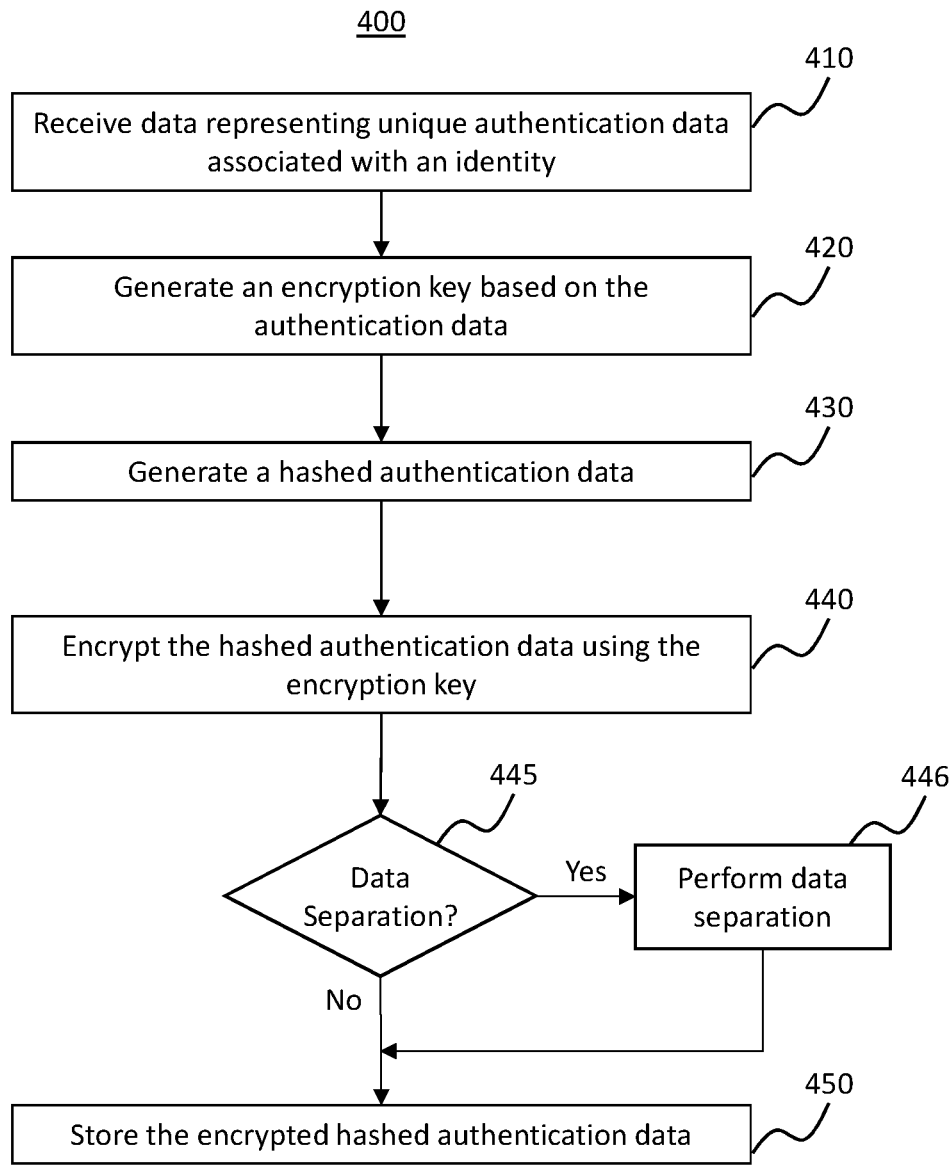
FIG. 4 is a flowchart depicting an example process for registering authentication data of a client identity in accordance with disclosed embodiments.

FIG. 4 is a flowchart depicting a process 400 for registering authentication data of a client identity in accordance with disclosed embodiments. Process 400 may be practiced according to the registration process described in process 200. For example, process 400 may be carried out by an authentication server to register a client identity for later authentication.

In step 410, process 400 may include receiving data representing unique authentication data associated with an identity. As in process 200, for example, step 410 may include receiving authentication data 211 associated with client identity 210. As described above, the client identity may be a user or other identity requesting to access or register for a protected network resource through an authentication service. The client identity may provide authentication data to the authentication service, which may be stored for later authentication of the client identity.

In step 420, process 400 may include generating an encrypted key based on the authentication data. The encryption key may be generated based on the unique authentication data received in step 410. As discussed above, the encryption key may be a symmetric key and may be generated using various encryption algorithms, such as DES, TDES, AES, CAST-128, Twofish, Serpent, or various others. The generated encryption key may be stored temporarily (e.g., in cache memory, RAM, etc.) or in long-term memory.

In step 430, process 400 may include generating hashed authentication data. The hashed authentication data may be generated based on the unique authentication data received in step 410. As in process 200, the hashed authentication data may be generated based on any form of non-restorable digital manipulation of the unique authentication data including, for example, a hashed value. Accordingly, step 430 may include use of a cryptographic hashing algorithm (e.g., MD5, SHA-1, SHA-2, SHA-3, RIPEMD-160, etc.). Similar to the encryption key, the generated hashed authentication data may be stored temporarily (e.g., in cache memory, Flash, etc.) or in long-term memory. While process 400 shows step 420 preceding 430, it should be noted that these steps may be performed in another order than shown in FIG. 4. For example, in accordance with the disclosed embodiments, step 430 may occur before or concurrently with step 420.

In step 440, process 400 may include encrypting the hashed authentication data generated in step 430 using the encryption key generated in step 420. In step 445, process 400 may determine whether data separation is required. This may be determined based on settings or preferences set by the client identity or by an access-restricted resource. For example, a corporate network may require authentication data to be stored using a sharding process for added security. If data separation is required, process 400 may include performing data separation, as shown in step 446. As described above with respect to process 200, step 446 may include splitting the encrypted hashed authentication data according to a particular file splitting (e.g., sharding) technique. For example, the data may be split into a number of portions based on an algorithm such as Shamir's Scheme, Blakley's Scheme, Mignotte's Scheme, Asmuth-Bloom's Scheme, or various other types of schemes. Alternatively, if no data separation is required, process 400 may proceed to storage of the hashed authentication data in step 450.

In step 450, process 400 may include storing the encrypted hashed authentication data. If the encrypted hashed authentication data was separated in step 446, the separated portions of data may be stored across multiple storage resources. The encrypted hashed authentication data may be stored, for example, locally (e.g., a memory in the authentication service) or in a remote storage location such as a network or online server or other storage resource. The data may also be stored in a combination of different resources or in multiple partitions thereof.

Figure 5:
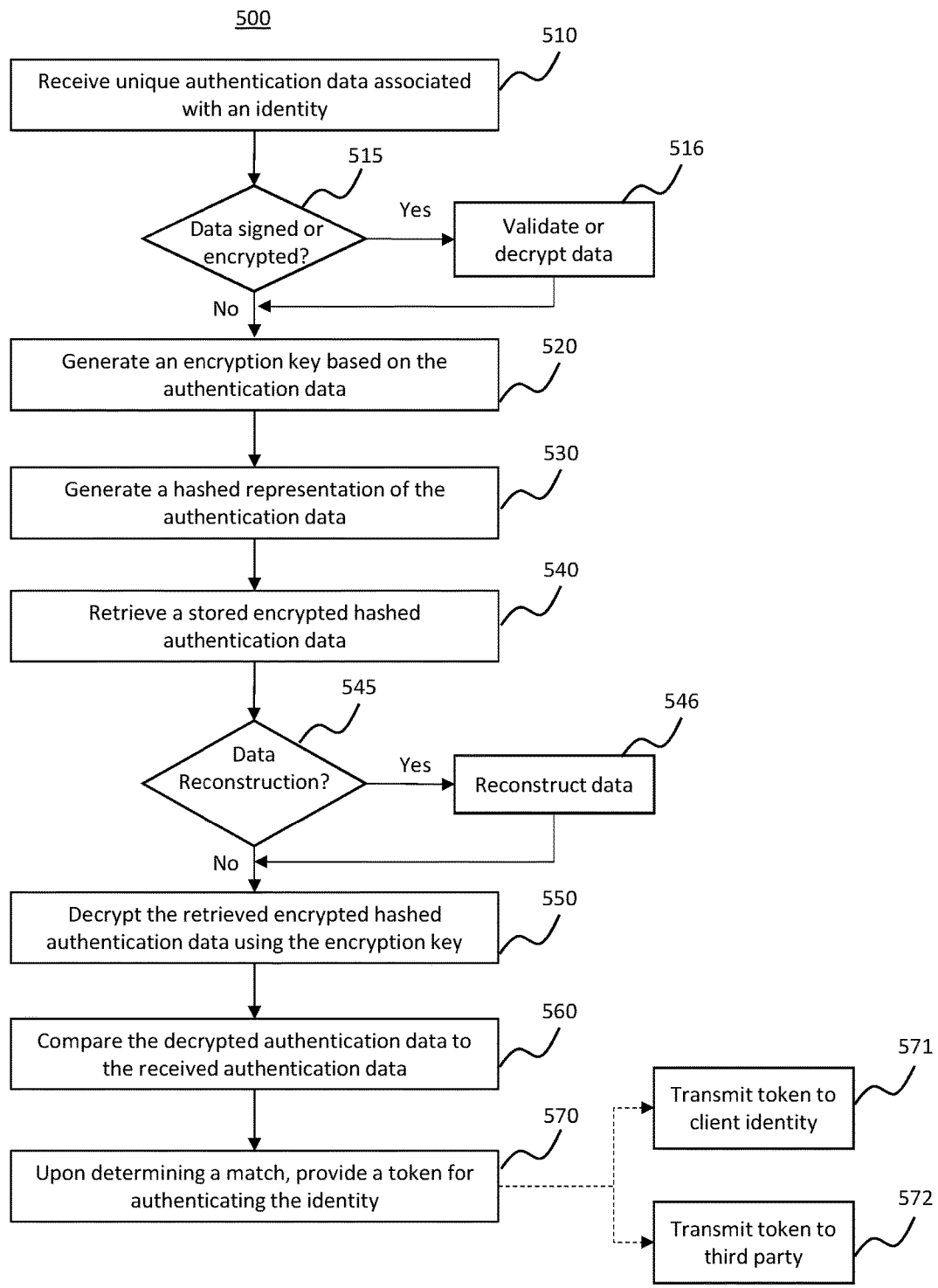
FIG. 5 is a flowchart depicting an example process for verifying authentication data for a client identity in accordance with disclosed embodiments.

FIG. 5 is a flowchart depicting a process 500 for verifying authentication data for a client identity in accordance with disclosed embodiments. Process 500 may be practiced according to the authentication or login process described in process 300. For example, process 500 may be carried out by an authentication server to authenticate a client identity.

In step 510, process 500 may include receiving unique authentication data associated with an identity. This authentication data may be provided to an authentication service by a client identity. As in process 300, the authentication data may be included in a request to access a resource. A request, for example, may be sent by a user attempting to access a network resource and may include the user's username and password.

The authentication data received in step 510 may also be encrypted or signed using an asymmetric key. For example, a client identity may sign the authentication data according to process 600 or may encrypt the data according to process 700 for added security. It should be noted that in some embodiments, both process 600 and process 700 may be performed. Process 500 may include step 515 to determine whether the data has been signed or encrypted. In the event that asymmetric keys are used, process 500 may include step 516 to validate or decrypt the authentication data. For example, step 516 may include verifying that the authentication data is signed by the holder of a user private key (e.g., as in process 600), and/or decrypting the authentication data using a system private key (e.g., as in process 700). If the data is not encrypted or signed using asymmetric keys, process 500 may proceed to step 520.

In step 520, process 500 may include generating an encryption key based on the authentication data. The encryption key may be generated based on the unique authentication data received in step 510. As discussed above, the encryption key may be a symmetric key and may be generated using various encryption algorithms, such as DES, TDES, AES, CAST-128, Twofish, Serpent or various others. The generated encryption key may be stored temporarily (e.g., in cache memory) or in long-term memory.

In step 530, process 500 may include generating a hashed representation of the authentication data. The hashed authentication data may be generated based on the unique authentication data received in step 510. As in process 300, the hashed authentication data may be generated based on any form of non-restorable digital manipulation of the unique authentication data including, for example, a hashed value. Accordingly, step 530 may include use of a cryptographic hashing algorithm (e.g., MD5, SHA-1, SHA-2, SHA-3, RIPEMD-160, etc.). Similar to the encryption key, the generated hashed authentication data may be stored temporarily (e.g., in cache memory) or in long-term memory. While process 500 shows step 520 preceding 530, it should be noted that these steps may be performed in another order than shown in FIG. 5. For example, in accordance with the disclosed embodiments, step 530 may occur before or concurrently with step 520.

In step 540, process 500 may include retrieving a stored encrypted hashed authentication data. The stored hashed data may be stored locally (e.g., in the memory of an authentication service) or in a remote location, such as on a remote server or online file storage service.

In accordance with the present disclosure, the encrypted hashed authentication data may be retrieved as a plurality of data portions stored in a plurality of data storage locations. As in process 300, the encrypted hashed data may be split into multiple shards and stored in multiple remote storage resources. In these embodiments, retrieving the encrypted hashed authentication data associated may include reconstructing the encrypted hashed authentication data from the plurality of data portions. In step 545, process 500 may include determining whether data reconstruction is required based on whether the stored encrypted hashed authentication data has been separated. If data reconstruction is required, process 500 may reconstruct the data from multiple portions in step 546. If no data reconstruction is required, process 500 may proceed to decryption of the retrieved data.

In step 550, process 500 may include decrypting the retrieved encrypted hashed authentication data using the encryption key. The encrypted hashed authentication data retrieved in step 540 may be decrypted using the encryption key generated in step 520. As a result of the decryption, process 500 may produce decrypted hashed authentication data. While process 500 shows step 546 preceding 550, it should be noted that these steps may be performed in another order than shown in FIG. 5. For example, in accordance with the disclosed embodiments, process 500 may include decrypting two or more stored portions of hashed authentication data and then reconstructing the decrypted portions to produce a decrypted hashed authentication data.

In step 560, process 500 may include comparing the decrypted authentication data to the received authentication data. For example, an authentication service may compare the hashed representation of the authentication data generated in step 530 with the decrypted hashed authentication data generated in step 550. A match between the two forms of hashed authentication data may indicate that a client identity is authenticated.

In step 570, process 500 may include, upon determining a match, providing a token for authenticating the identity. The token may be, for example, token 361 as shown in FIG. 3. The token may indicate that the client identity has been authenticated and may be used for later steps in an authentication process. In some embodiments, process 500 may include transmitting the token to a client identity, as shown in step 571. The client identity may use the token, for example, to access a restricted resource or service. In other embodiments, process 500 may include transmitting the token to a third party. For example, the token may be transmitted directly to a resource to which a client identity has requested access. Process 500 may also be performed in accordance with an authentication protocol (e.g., Kerberos) as described above relating to process 300.

Figure 6:
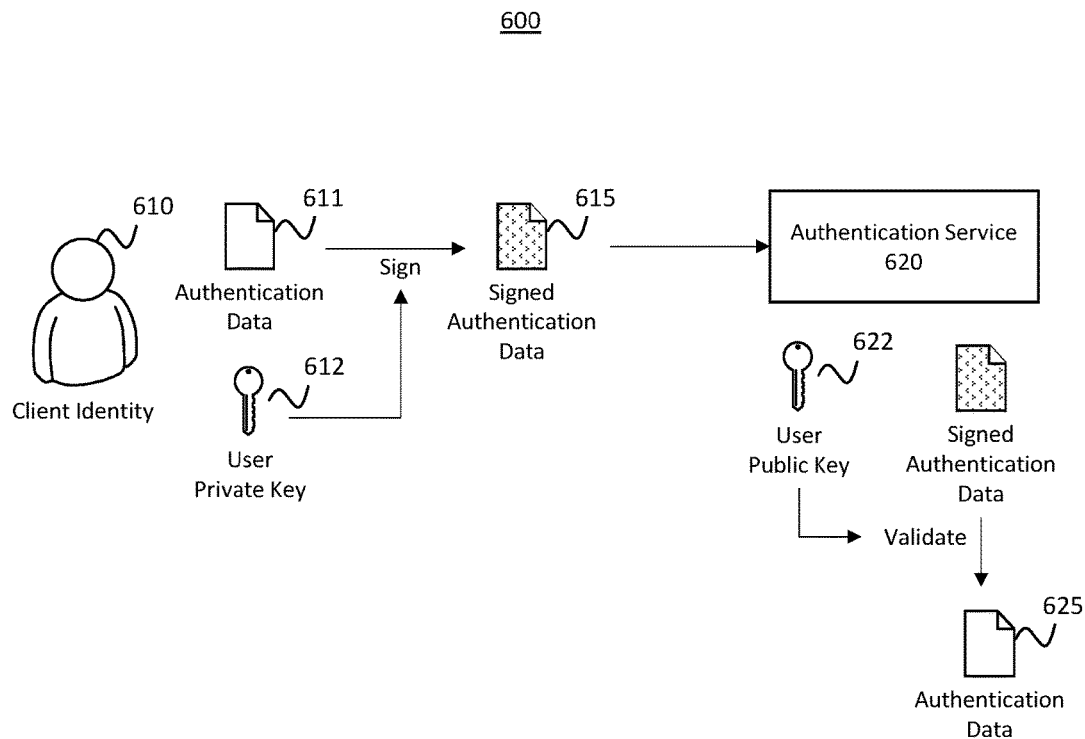
FIG. 6 is an illustration of an example process for validating a client identity using a pair of encryption keys of the client identity.

FIG. 6 is an illustration of a process 600 for validating a client identity 610 using a pair of encryption keys of the client identity. As shown in FIG. 6, process 600 includes a client identity 610 and an authentication service 620. Client identity 610 may be any of the example client identities 101, 102, 103, 104, 105, 106, or 107 as shown in FIG. 1. Process 600 may be performed as part of other processes in the disclosed embodiments. For example, process 600 may be performed in conjunction with process 300 or process 500 for added security. Client identity 610 may be client identity 210 or 310 described above and authentication service 620 may be authentication service 220 or 320 described above.

Process 600 may also include generating or accessing a pair of asymmetric keys 612 and 622. Client identity 610 may generate keys 612 and 622 using, for example, a key generation algorithm, or they may be generated by other means (e.g., a third party). Client identity 610 may sign authentication data 611 using a user private key 612. Accordingly, client identity 610 may use an asymmetric signing algorithm, such as PGP, GPG, RSA, DSA, EdDSA, ElGamal or other digital signature algorithms, to sign authentication data 611. Client identity 610 may then send signed authentication data 615 to authentication service 620. As shown in FIG. 6, authentication service 620 may then validate the signed authentication data using public key 622 to verify the signature belongs to client identity 610. Authentication service 620 may use a signature verifying algorithm to either accept or reject authenticity of authentication data 615 using public key 622 and the signed authentication data 615. Using process 600, authentication service 610 may verify that the authentication data was signed using private key 612 and ensure the authentication data has not been tampered with. Public key 622 may be sent to authentication service 620 or it may be distributed by other public key systems or architecture. Authentication service 620 may then use validated authentication data 625 for further processes of the disclosed invention. For example, authentication system 620 may use authentication data 625 to generate encryption key 321 and hashed data 322 according to process 300, as shown in FIG. 3. Validated authentication data 625 may include the digital signature provided by client identity 610.

Figure 7:
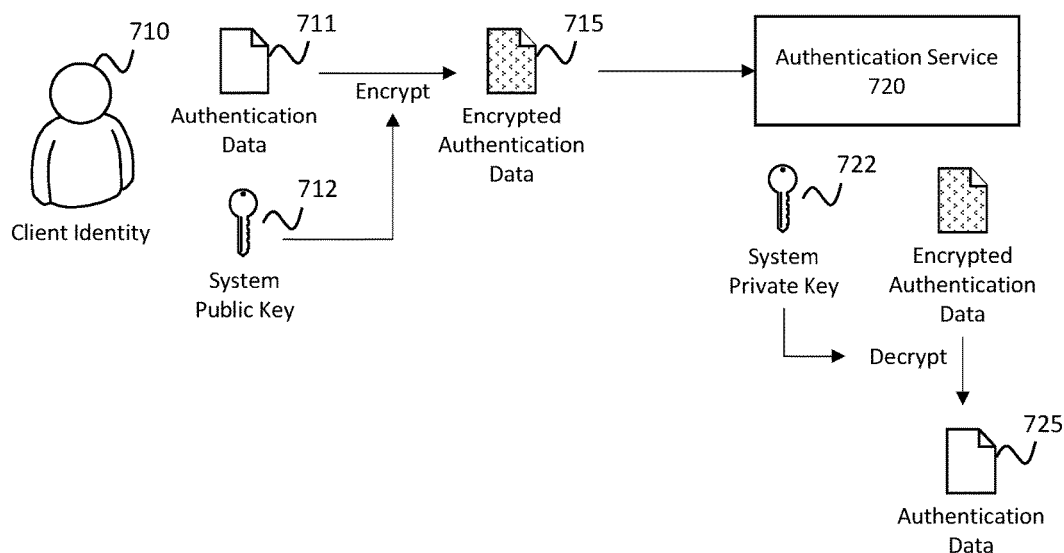
FIG. 7 is an illustration of an example process for validating a client identity using a pair of encryption keys of the authentication system.

FIG. 7 is an illustration of a process 700 for validating a client identity 710 using a pair of encryption keys of the authentication service. As shown in FIG. 7, process 700 includes a client identity 710 and an authentication service 720. Client identity 710 may be any of the example client identities 101, 102, 103, 104, 105, 106, or 107 as shown in FIG. 1. Process 700 may be performed as part of other processes in the disclosed invention. For example, process 700 may be performed in conjunction with process 300 or process 500 for added security. Client identity 710 may be client identity 210 or 310 described above and authentication service 720 may be authentication service 220 or 320 described above.

Process 700 may also include a pair of asymmetric keys 712 and 722. Keys 712 and 722 may be distributed and managed according to a public key infrastructure (PKI) or a Windows domain controller, or another central server configurable to manage the keys. For example, the keys may be generated and distributed according to the Diffie-Hellman key exchange scheme. Client identity 710 may encrypt authentication data 711 using a system public key 712. The authentication data 711 may be encrypted such that it may only be decrypted using matching private key 722. Accordingly, client identity 710 may use an asymmetric cryptography algorithm, such as TLS, PGP, GPG, RSA, or other public key algorithms, to encrypt authentication data 711. Client 710 may then send encrypted authentication data 715 to authentication service 720. As shown in FIG. 7, authentication service 720 may then decrypt the signed authentication data using private key 722. Authentication service 720 may then use validated authentication data 725 for further processes of the disclosed invention. For example, authentication system 720 may use authentication data 725 to generate encryption key 321 and hashed data 322 according to process 300, as shown in FIG. 3. Process 700 can be performed as an alternative to, or in addition to process 600.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for secure authentication for access to a restricted resource, the operations comprising:
- receiving a request for access to the restricted resource by a client identity;
- identifying asserted authentication data associated with the request;
- generating, in response to the request, an encryption key, the encryption key being uniquely generated based on the asserted authentication data;
- generating, in response to the request, a non-restorable digital representation of the asserted authentication data;
- retrieving an encrypted digital representation of authentication data associated with the client identity, wherein:
  - the encrypted digital representation of authentication data is retrieved as a plurality of data portions stored in a plurality of data storage locations; and
  - retrieving the encrypted digital representation of authentication data comprises reconstructing the encrypted digital representation of authentication data from at least a portion of the plurality of data portions;
- decrypting the retrieved encrypted digital representation of authentication data using the encryption key to produce a decrypted digital representation of authentication data;
- comparing the decrypted digital representation of authentication data to the generated digital representation of the asserted authentication data; and
- generating a token for use in an authentication process for the client identity upon determining, based on the comparing, a match between the stored digital representation of authentication data and the digital representation of the asserted authentication data.

2. The non-transitory computer readable medium of claim 1, wherein generating the non-restorable digital representation of the asserted authentication data is performed using a hash function algorithm.

3. The non-transitory computer readable medium of claim 1, wherein the request for access to the restricted resource includes the asserted authentication data.

4. The non-transitory computer readable medium of claim 1, wherein the encryption key is a symmetric key.

5. The non-transitory computer readable medium of claim 1, wherein the operations further comprise transmitting the token to at least one of: the client identity or a third-party authentication service.

6. The non-transitory computer readable medium of claim 1, wherein the asserted authentication data is signed with a private key associated with the client identity and the operations further comprise:
- verifying the client identity based on the asserted authentication data using a public key associated with the client identity.

7. The non-transitory computer readable medium of claim 1, wherein the asserted authentication data is encrypted with a public key associated with the authentication system and the operations further comprise:
- decrypting the asserted authentication data using a private key associated with the authentication system.

8. The non-transitory computer readable medium of claim 1, wherein the operations further comprise:
- receiving an original authentication data associated with the client identity;
- generating an original non-restorable digital representation of authentication data based on the original authentication data;
- generating an original encryption key based on the original authentication data;
- encrypting the original digital representation of authentication data using the original encryption key to generate the encrypted digital representation of authentication data; and
- storing the encrypted digital representation of authentication data.

9. The non-transitory computer readable medium of claim 8, wherein storing the encrypted digital representation of authentication data includes separating the encrypted digital representation of authentication data into the plurality of data portions and storing the plurality of data portions across a plurality of storage resources.

10. A computer-implemented method for secure authentication for access to a restricted resource, the method comprising:
- receiving a request for access to the restricted resource by a client identity;
- identifying asserted authentication data associated with the request;
- generating, in response to the request, an encryption key, the encryption key being uniquely generated based on the asserted authentication data;
- generating, in response to the request, a non-restorable digital representation of the asserted authentication data;
- retrieving an encrypted digital representation of authentication data associated with the client identity, wherein:
  - the encrypted digital representation of authentication data is retrieved as a plurality of data portions stored in a plurality of data storage locations; and
  - retrieving the encrypted digital representation of authentication data comprises reconstructing the encrypted digital representation of authentication data from at least a portion of the plurality of data portions;
- decrypting the retrieved encrypted digital representation of authentication data using the encryption key to produce a decrypted digital representation of authentication data;
- comparing the decrypted digital representation of authentication data to the generated digital representation of the asserted authentication data; and
- generating a token for use in an authentication process for the client identity upon determining, based on the comparing, a match between the stored digital representation of authentication data and the digital representation of the asserted authentication data.

11. The computer-implemented method of claim 10, wherein generating the non-restorable digital representation of the asserted authentication data is performed using a hash function algorithm.

12. The computer-implemented method of claim 10, wherein the request for access to the restricted resource includes the asserted authentication data.

13. The computer-implemented method of claim 10, wherein the encryption key is a symmetric key.

14. The computer-implemented method of claim 10, further comprising transmitting the token to at least one of: the client identity or a third-party authentication service.

15. The computer-implemented method of claim 10, wherein the asserted authentication data is signed with a private key associated with the client identity and the method further comprises:

verifying the client identity based on the asserted authentication data using a public key associated with the client identity.

16. The computer-implemented method of claim 10, wherein the asserted authentication data is encrypted with a public key associated with the authentication system and the method further comprises:

decrypting the asserted authentication data using a private key associated with the authentication system.

17. The computer-implemented method of claim 10, further comprising:

receiving an original authentication data associated with the client identity;

generating an original non-restorable digital representation of authentication data based on the original authentication data;

generating an original encryption key based on the original authentication data;

encrypting the original digital representation of authentication data using the original encryption key to generate the encrypted digital representation of authentication data; and storing the encrypted digital representation of authentication data.

18. The computer-implemented method of claim 17, wherein storing the encrypted digital representation of authentication data includes separating the encrypted digital representation of authentication data into the plurality of data portions and storing the plurality of data partitions across a plurality of storage resources.

\* \* \* \* \*